United States Patent

Brewer

[15] 3,639,875

[45] Feb. 1, 1972

[54] STRAIN GAGE ASSEMBLY AND METHOD OF ATTACHMENT

[72] Inventor: Given A. Brewer, Marion, Mass.

[73] Assignee: Brewer Engineering Laboratories, Inc., Marion, Mass.

[22] Filed: Aug. 24, 1970

[21] Appl. No.: 66,484

[52] U.S. Cl. ............................................................338/2
[51] Int. Cl. ..............................................................H01c 9/06
[58] Field of Search ...............................................338/2, 3

[56] References Cited

UNITED STATES PATENTS 2,363,181  11/1944  Howland.....................................338/2
3,222,627  12/1965  Tolotta........................................338/2
3,475,712  10/1969  Brown.........................................338/2

*Primary Examiner*—Rodney D. Bennett, Jr.
*Assistant Examiner*—R. Kinberg
*Attorney*—Martin Kirkpatrick

[57] ABSTRACT

A strain-deformable wire resistance strain gage is cemented to a ship propeller, and covered with a settable plastic protective layer in unset state; a sheet metal overlay is spot-welded through the plastic to the propeller, after which the plastic is cured, forming a seal around the welds.

8 Claims, 6 Drawing Figures

PATENTED FEB 1 1972 3,639,875
FIG 1
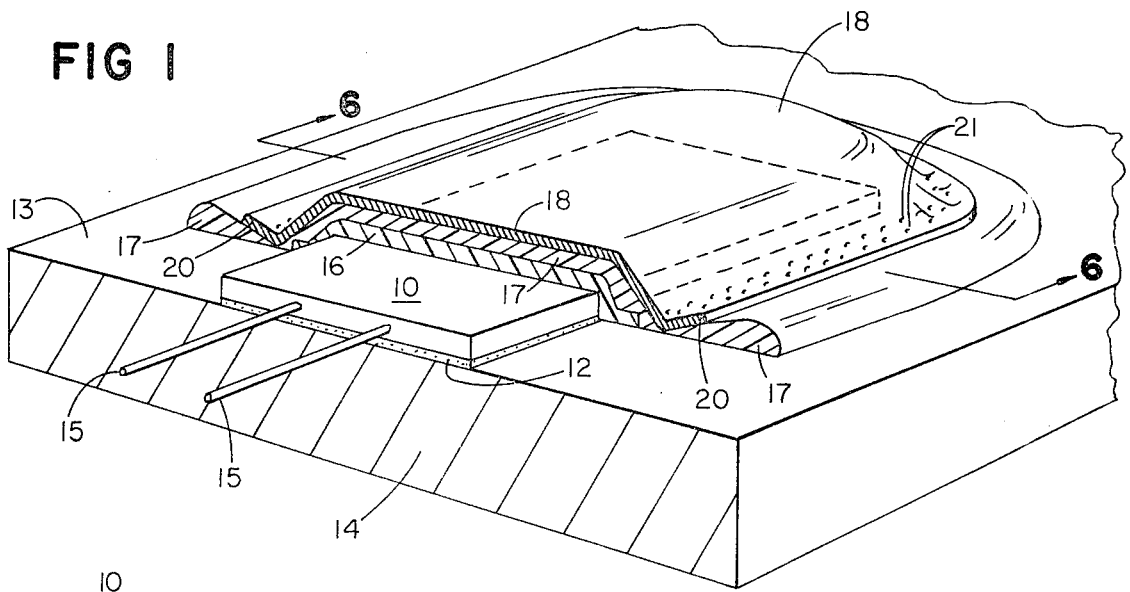
FIG 2
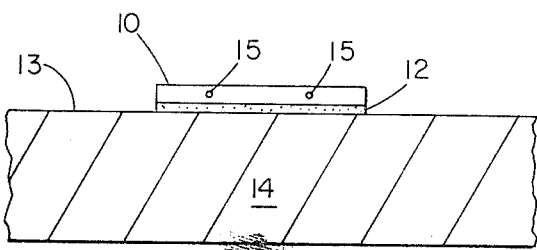
FIG 3
FIG 5
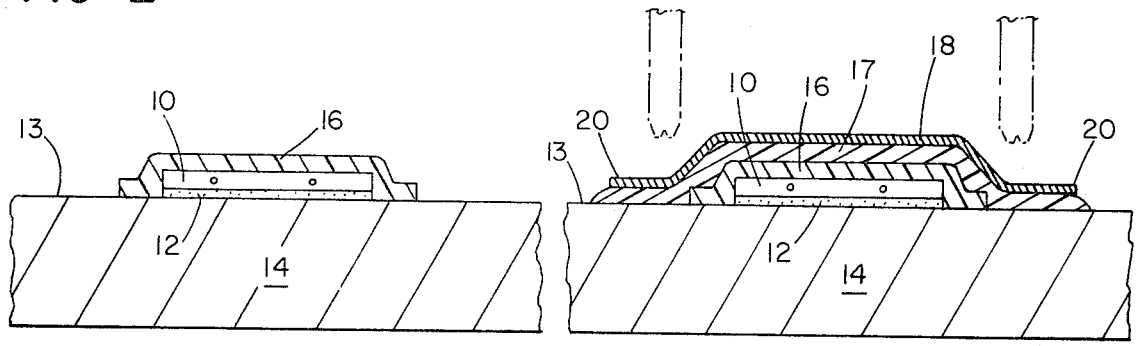
FIG 4
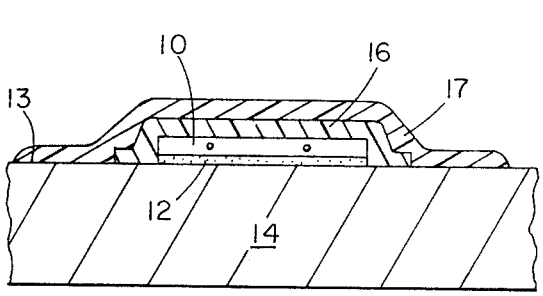
FIG 6
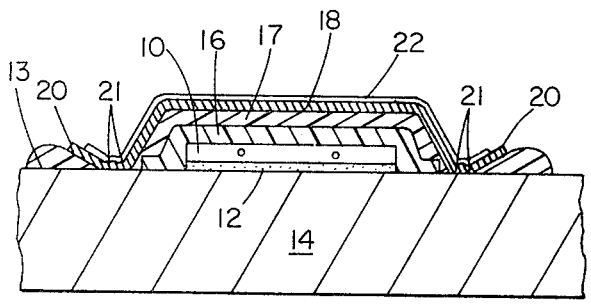

STRAIN GAGE ASSEMBLY AND METHOD OF ATTACHMENT

This invention relates to strain gages. More particularly, it relates to strain gage assemblies suitable for use on ship's propellers, hulls, and steam and water turbines.

In the past, many attempts have been made to provide a method of attaching a strain gage to a ship's propeller or hull such that the gage remains operable in spite of repeated flexings and prolonged vibrations of the structure to which it s attached, as well as erosion caused by water flowing rapidly past the gage, and the corrosive effects of a salt water environment. Previously it has been attempted to use epoxies or synthetic rubbers to seal out moisture from the strain gage, since even the slightest leak will cause loss of the strain measurements. However, while some success has been attained in use on ship hulls, none of the previously attempted solutions has provided a sufficiently durable seal to be of practical value on a propeller.

It is therefore an object of the present invention to provide a novel and improved method of attaching a strain gage to an underlying structure such as a ship hull or propeller in which strain or deformation s to be monitored, such that the attachment remains firm and reliable under prolonged use in a corrosive environment such as salt water.

It is also an object to provide a strain gage assembly that is flexible and durable when attached to a structure subject to repeated flexing and prolonged vibration.

It is a further object to provide a strain gage assembly that operates reliably despite the effects of water flowing rapidly and forcefully over the assembly.

The invention features a method of attaching a strain gage to a surface of a metallic structure such as a hull or propeller by cementing the gage to the structure, covering the gage with a protective barrier layer of a settable plastic in an unset state, placing over the unset protective layer a sheet metal overlay, and welding the overlay through the protective layer to the underlying structure. The plastic of the barrier layer is then set, providing a watertight seal around each weld.

In preferred embodiments, the protective barrier s of a synthetic elastomeric material, such as PR–385M–B ½, and the sheet metal overlay is of stainless steel.

Other objects, features and advantages will appear from the following description of a preferred embodiment of the invention, taken together with the attached drawings thereof, in which:

FIG. 1 is a perspective view of a strain gage assembly constructed according to the method of the invention, partially cut away;

FIGS. 2, 3, 4, and 5 show the assembly at successive stages of the method of the invention; and, FIG. 6 is a cross-sectional view taken on the lines 6—6 of FIG. 1.

Referring now to the drawings, stain or deformation is to be monitored in a structure 14, which may be, for example, a ship's hull or propeller. The strain gage is to be attached to surface 13 of propeller 14. For this purpose surface 13 must first be prepared by removing all foreign matter, such as paint, oxide, scale, and the like, by use of a disc sander, leaving surface 13 smooth. The surface is next cleaned with tissue saturated with methyl ethyl ketone (M.E.K.). The areas to which the gage and the lead wires are to be attached are then grit blasted with no. 80 aluminous oxide grit, after which the surface is again cleaned with tissue saturated with M.E.K. The location of the gage is then marked, and the surface again is cleaned with M.E.K. A chemical cleaner such as that sold under the trade name "Solox" by U.S. Industrial Chemical Co. is then applied to the area with a cotton swab and removed with a single stroke of clean tissue. The surface must be dry and at a temperature of 60° to 100° F. a strain-deformable resistance wire strain gage 10 is then cemented to surface 13 by a layer of cement 12, which may be any of several suitable compounds known in the art, for example, that sold under the name of Eastman 910 cement (FIG. 2). Lead wires 15 are then attached to the terminals of strain gage 10.

Coming now to the novel steps in the process of attaching the strain gage according to the present invention, a protective barrier layer of settable plastic is now deposited over strain gage 10. For this purpose, the area of the gage and the underlying propeller to be covered by the plastic layer are prepared by a thorough cleansing with methyl ethyl ketone and Solox. Next, the areas not intended to be covered by the plastic layer are masked, leaving an area for application extending approximately one-half inch around strain gage 10 and approximately one-eighth inch around lead wires 15.

A layer 16 of waterproofing compound such as that sold under the trade name PR–385M–B ½ by Products Research & Chemical Corp. of Gloucester City, N.J., is now applied, in a liquid state, to the areas left exposed by the masking, and is built up to a thickness of approximately one-eighth inch over gage 10 and one-sixteenth inch over lead wires 15 (FIG. 3). The mask is removed while the settable plastic is still wet, and the plastic is allowed to cure overnight at room temperature.

The sheet metal overlay 18 is made of any suitable material, but preferably of type 316 stainless steel of approximately 0.003 inch thick. The overlay for gage 10 should be of dimensions to provide side flange portions 20 extending approximately one-half inch beyond the edge of plastic layer 16; overlays for lead wires 15, not separately shown in the drawings, should extend approximately one-fourth inch beyond the plastic layer covering wires 15. Overlay 18 is then thoroughly cleaned with M.E.K. and Solox.

A fresh coat 17 of the settable plastic is now applied to gage 10 and lead wires 15 over layer 16, extending beyond layer 16 by approximately one-half inch (FIG. 4). Sheet metal overlay 18 is placed in position over unset plastic layer 17, as shown in FIG. 5, and pressure is applied to squeeze out excess liquid plastic around the outer edges. Overlay 18 is now spot welded to surface 13, using a welder adjusted to about 12 to 14 watt seconds. Two rows of spots 21 (FIG. 1) are welded as close together as possible around the entire installation (FIG. 6).

After the welding has been completed, plastic layer 11 is allowed to set, causing it to form a void-free seal surrounding the weld spots. If desired, a further seal of the same plastic material may be deposited over the weld at 22, as shown in FIG. 6.

After the steps of this process have been completed, the resulting strain gage assembly comprises strain-deformable resistance wire strain gage 10 cemented to surface 13 of propeller 14, a protective barrier of a settable elastomeric plastic deposited in layers 16 and 17 completely covering the exposed surface of gage 10 and extending beyond the gage over a portion of surface 13, and a stainless steel overlay covering the protective plastic layers and welded to the underlying propeller. The plastic of layer 17 provides an effective void-free seal surrounding each weld spot 21, while the sheet metal overlay is securely attached to the propeller and protects the protective plastic, gage 10, and lead wires 15 from abrasion and erosion.

What is claimed is:

1. The method of attaching a strain-deformable resistance wire strain gage to a surface of a metallic structure in which strain is to be monitored, comprising the following steps:
   a. cementing said strain gage to said structure surface
   b. placing over said strain gage a protective barrier layer of settable plastic in an unset state, completely covering the exposed surface of said strain gage and extending therebeyond over a portion of said structure surface
   c. placing over said settable plastic barrier layer a sheet metal overlay covering that portion of said barrier layer that covers said strain gage and providing flange portions on either side thereof
   d. welding said flange portions of said overlay through said settable plastic barrier layer to said surface of said structure by pressing at least a part of said flange portion through said settable plastic barrier layer into contact with underlying said structure surface and causing an electric current to flow through said portion to said surface, and e. thereafter setting said settable plastic and thereby providing a void-free seal around said weld.

2. The method of claim 1 wherein said settable plastic is an elastomeric material.

3. The method of claim 1 wherein said settable plastic in its said unset state conducts electric current.

4. The method of claim 1 wherein said sheet metal overlay is stainless steel about 0.0003-inches thick.

5. In a strain gage assembly for monitoring deformation of a metallic structure, the combination of a strain-deformable resistance wire strain gage cemented to a surface of said structure, a protective barrier layer of settable plastic completely covering the expose surface of said strain gage and extending therebeyond over a portion of said structure surface, and a sheet metal overlay covering that portion of said protective barrier layer that covers said strain gage and providing flange portions on either side, at least a part of said flange portions being welded through said settable plastic barrier layer to said structure surface, said plastic barrier layer thereby providing a void-free seal surrounding said weld.

6. The combination of claim 5 wherein said settable plastic is an elastomeric material.

7. The combination of claim 5 wherein said sheet metal overlay is of stainless steel about 0.0003-inches thick.

8. In a strain gage assembly for monitoring deformation of a metallic structure, the combination of a strain-deformable resistance wire strain gage cemented to a surface of said structure, a protective barrier layer of a settable elastomeric plastic completely covering the exposed surface of said strain gage, and extending therebeyond over a portion of said structure surface, and a stainless steel overlay about 0.0003 inches thick covering that portion of said protective barrier layer that covers said strain gage and providing flange portions on either side, at least a part of said flange portions being welded through said protective barrier layer to said structure surface, said barrier layer thereby providing a void-free seal surrounding said weld.

* * * * *